(12) United States Patent
Lindgren et al.

(10) Patent No.: US 8,386,616 B2
(45) Date of Patent: Feb. 26, 2013

(54) METHOD OF RETRIEVING INFORMATION FROM A NOTIFYING NODE OF SIP/IMS NETWORK TO A WATCHER CLIENT

(75) Inventors: Anders Lindgren, Älvsjö (SE); Christer Boberg, Tungelsta (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 33 days.

(21) Appl. No.: 12/742,498

(22) PCT Filed: Dec. 21, 2007

(86) PCT No.: PCT/SE2007/001146
§ 371 (c)(1),
(2), (4) Date: May 12, 2010

(87) PCT Pub. No.: WO2009/064226
PCT Pub. Date: May 22, 2009

(65) Prior Publication Data
US 2010/0262697 A1 Oct. 14, 2010

Related U.S. Application Data

(60) Provisional application No. 60/988,604, filed on Nov. 16, 2007.

(51) Int. Cl.
G06F 15/16 (2006.01)
G06F 15/173 (2006.01)
G06F 15/177 (2006.01)

(52) U.S. Cl. ........ 709/227; 709/203; 709/230; 370/352; 370/453

(58) Field of Classification Search .......... 709/217–230, 709/200–203; 370/352, 453
See application file for complete search history.

(56) References Cited

U.S. PATENT DOCUMENTS

| 7,274,943 B2* | 9/2007 | Trossen ................... 455/461 |
| 7,529,813 B2* | 5/2009 | Lim et al. ................ 709/219 |
| 7,680,478 B2* | 3/2010 | Willars et al. ........... 455/343.2 |
| 7,886,013 B2* | 2/2011 | Christoffersson et al. .... 709/206 |
| 2005/0009537 A1 | 1/2005 | Crocker et al. |
| 2005/0213537 A1* | 9/2005 | Ingimundarson et al. ..... 370/329 |
| 2006/0149811 A1* | 7/2006 | Bennett et al. ............. 709/203 |
| 2006/0155814 A1* | 7/2006 | Bennett et al. ............. 709/207 |
| 2006/0253873 A1* | 11/2006 | Lim et al. ................. 725/62 |
| 2007/0076751 A1* | 4/2007 | Garcia-Martin et al. ..... 370/466 |
| 2007/0150605 A1* | 6/2007 | Christoffersson et al. .... 709/228 |
| 2007/0156909 A1* | 7/2007 | Osborn et al. ............. 709/227 |
| 2007/0259673 A1* | 11/2007 | Willars et al. ............. 455/453 |
| 2008/0112431 A1* | 5/2008 | Jagadesan et al. ......... 370/453 |
| 2008/0281971 A1* | 11/2008 | Leppanen et al. .......... 709/228 |
| 2008/0288649 A1* | 11/2008 | Burckart et al. ........... 709/230 |
| 2009/0017796 A1* | 1/2009 | Foti ....................... 455/414.1 |
| 2009/0222525 A1* | 9/2009 | Jayawant Pattan ........... 709/206 |
| 2009/0275314 A1* | 11/2009 | Cotevino et al. .......... 455/414.2 |

FOREIGN PATENT DOCUMENTS

| EP | 1 292 081 A2 | 3/2003 |
| EP | 1 441 486 A2 | 7/2004 |
| WO | WO 2006/131597 A1 | 12/2006 |

* cited by examiner

*Primary Examiner* — Haresh N Patel

(57) ABSTRACT

A method of delivering information from a Notifying node of a SIP/IMS network to a Watcher Client, via an intermediate Watcher Proxy. A connection is established between the Watcher Proxy and the Watcher Client, using a SIP session, wherein the established connection is used for forwarding a request for a SIP subscription to the Watcher Proxy as an embedded SIP subscribe message. Once a backend SIP subscription has been setup between the Watcher Proxy and the Notifying node, SIP notify messages delivered from the Notifying node will be forwarded from the Watcher Proxy to the Watcher Client via the established connection, thereby separating SIP subscribe traffic from SIP control traffic.

14 Claims, 4 Drawing Sheets

METHOD OF RETRIEVING INFORMATION FROM A NOTIFYING NODE OF SIP/IMS NETWORK TO A WATCHER CLIENT

This application claims the benefit of U.S. Provisional Application No.60/988,604, filed Nov. 16, 2007, the disclosure of which is fully incorporated herein by reference.

TECHNICAL FIELD

The present invention generally relates to a method of delivering notifications according to a SIP event package event package, such as e.g. presentity information or XCAP changes, in an IMS network, and more specifically to a method for avoiding interference between this type of traffic and normal SIP traffic control signaling. The present invention also relates to a client and a node adapted to execute the method.

BACKGROUND

The IP Multimedia Subsystem (IMS) is an architecture based on the Session Initiation Protocol (SIP) which creates a common platform for enabling a broad range of advanced Internet-based multimedia services and applications on top of a packet switched network.

SIP provides an extensible event mechanism, enabling a specific service or SIP event package delivery, to route a set of state information or one or more notifications complying with a specific requested service from a server to a subscribing client.

IMS presence is one example of a service and a SIP event package that a user can subscribe for in order to obtain information about another users reach ability, availability and/or willingness of communication. The presence service can be used to indicate whether certain users are online or not and if online, whether they are idle or busy. Presence service also allows users to share details of their communication means and capabilities with other users.

One example of a general SIP-based presence architecture in the IMS according to the prior art is illustrated in FIG. 1.

A SIP/IMS network is a network of servers, performing a variety of services in support of the presence service, such as e.g. routing, authentication and compression. When the presence service is realized using IMS, the SIP/IMS network will perform a number of additional functions in support of the presence service, such as, e.g. routing of the SIP signaling between the presence sources, Watchers and a Presence Server (PS), authentication and authorization of the described entities, maintaining of the registration state and providing of charging information.

FIG. 1 shows a Watcher or a Watching client 100, requiring presence information associated with another user. Watcher 100 may get access to requested presence information provided via SIP/IMS network 101 via access network 102. The user of interest to the Watcher 100, is typically referred to as a Presentity 103. Presentity 103 may access the SIP/IMS network via the same access network as the Watcher 100, or as in this case, via another access network 104.

Throughout this document, both the Watcher 100 and the Presentity 103 will be defined as a combination of a user, or an automated function operating on behalf of a user, and a user agent (UA) located in an IMS terminal, such as e.g. a stationary PC, a laptop, a PDA or a cellular telephone, and adapted to contribute to the execution of a number of services, each of which is identified by a SIP event package.

The IMS network consists of conventional IMS nodes, such as Proxy Call Session Control Functions 105, 106 (P-CSCF's), a P-CSCF being the first point of contact between an IMS terminal and the SIP/IMS network, Serving Call Session Control Functions 107 (S-CSCF's), a S-CSCF being used as the central node of the signaling plane, and Interrogating Call Session Control Functions 108 (I-CSCF's), providing SIP proxy server functionality, as well as conventional databases, i.e. one or more Home Subscriber Servers 109 (HSS), being the central repository for user-related information, and, in case the network comprises more than one HSS, a Subscriber Location Function 110 (SLF), responsible for mapping user's addresses to an appropriate HSS.

In addition to the nodes mentioned above, the IMS network also typically comprises a plurality of Application Servers (AS's), which are SIP entities that hosts and executes different types of services to authorized users. FIG. 1 comprises two AS's, namely a Presence Server 111 (PS), which may be responsible for managing a presence service, and a Presence Source 112, which is an entity responsible for providing updated presence information to authorized Watchers via the PS 111 on behalf of a Presentity.

The network also comprises a Resource List Server 113 (RLS). An RLS is a functional entity that accepts and manages subscriptions to presence lists, which enables a Watcher to subscribe to presence information of multiple entities using only one single subscription transaction, thereby saving not only bandwidth, but also reducing the power consumption of the Watchers UE's.

Although FIG. 1 only comprises one Presence Source, there are typically a plurality of different Presence Sources available at an IMS network, each of which provides presence information of different categories to one or more Presence Server. It is also to be understood that a typical IMS network may comprise additional CSCF nodes of the types already mentioned, as well as other types of nodes which have been omitted, since they are of no relevant importance to the understanding of the authorization mechanism being the scope of this document.

Another example of a service type being of interest for the described mechanism is the support of XML Configuration Access Protocol (XCAP) changes. XCAP is a generic protocol that can be used for a number of purposes related to the configuration of XML documents stored in a server. This may include, e.g. updating of preferences, presence lists, privacy, or authorization policies.

Notifications, provided to a Watcher according to a requested SIP event package, comprising e.g. presence information are not SIP traffic control signaling. The same channel, i.e. the SIP control signaling channel, is, however, used both for the transmission of notifications, and for the transmission of the SIP traffic control signaling.

Not only can a presence notification, an XCAP document, or any other type of notification be quite large. This type of information can also arrive at any time, and, thus, notifications according to a SIP event package may cause interference problems with the normal SIP traffic control signaling.

In addition, since SIP traffic control signaling often has a higher priority than a media connection, notifications may be exposed to delays, or, during unfavorable conditions, even interruptions.

SUMMARY

The object of the present invention is to address at least the problems outlined above. In particular, it is an object of the present invention to provide a solution that can separate the transmission of notifications between an information source and a subscribing unit from the SIP control channel signaling so that notifications are delivered via the media plane, while the SIP control channel signaling is transmitted over the signaling plane.

According to one aspect, the present invention provides a method of retrieving information delivered from a Notifying node of a SIP/IMS network to a Watcher Client, as executed by the Watcher Client. The Watcher Client establishes a connection with a Watcher Proxy which is adapted to handle SIP subscriptions, i.e. subscriptions for a specific service which can be identified by a SIP event package. The Watcher Client uses the connection to initiate a SIP subscription between the Watching Proxy and the Notifying node. This can be executed by forwarding an embedded SIP subscribe message to the Watcher Proxy via the established connection. The Watcher Client then awaits reception of one or more notifications associated with the SIP subscription from the Watcher Proxy, wherein the notifications are delivered to the Watcher Client via the connection as an embedded SIP notify message.

The received notifications may be buffered at the Watcher Client, before they are handled according to predetermined rules.

According to one embodiment, the connection may be established by using a SIP session, which has been set-up in an initial step.

According to another aspect, the present invention provides a method of delivering information from a Notifying node of a SIP/IMS network to a Watcher Client, as executed by a Watcher Proxy.

Initially, the Watcher Proxy establishes a connection with the Watcher Client, in response to a session request received from the Watcher Client. Via the established connection, the Watcher Client then receives a request for a SIP subscription from the Watcher Client, wherein the SIP subscription is delivered via the connection as an embedded SIP subscribe message. In response to receiving the request, the Watcher Proxy sets-up a backend SIP subscription with the Notifying node. From now on, the Watcher Proxy may receive one or more notifications associated with the SIP subscription from the Notifying node. Received notifications are then transmitted from the Watcher Proxy to the Watcher Client via the connection as embedded SIP notify messages.

The session request used for initiating the described connection may be a SIP invite.

The transmitting step may be executed according to predetermined priority policies, specified for said connection.

The described connection may be a TCP connection, which is established using the SIP protocol.

The connection may also be configured as a Message Session Relay Protocol (MSRP) connection, wherein the embedded message will be embedded into an MSRP message.

According to further aspects, the present invention provides a client, which may be referred to e.g. as a Watcher Client and a node, which may be referred to e.g. as a Watcher Proxy, adapted to execute the method described above.

Further features and benefits of the present invention will become apparent from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Figure 1:
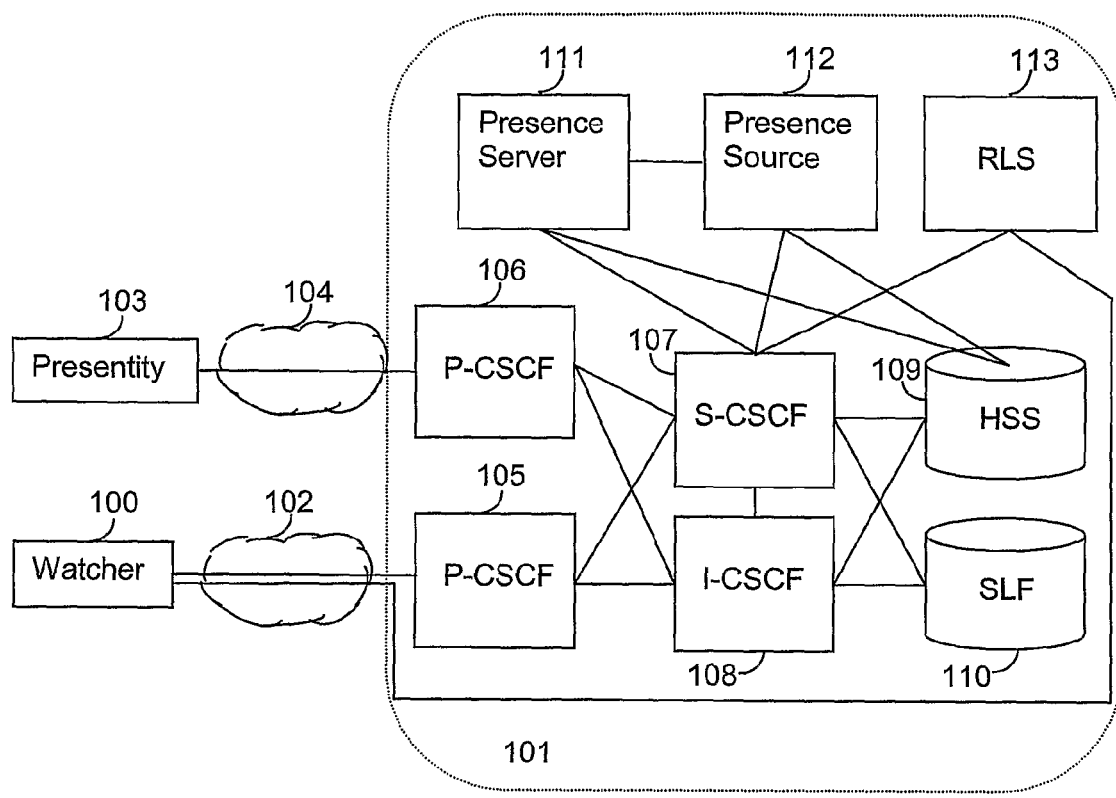
FIG. 1 illustrates a general SIP based presence architecture in the IMS, according to the prior art.

In order to handle at least some of the problems mentioned above, notifications according to a SIP event package, such as e.g. presence information or changes in XCAP documents, will be handled as media when transmitted between a Presentity and a Watcher, or a subscriber. Instead of using a SIP control channel signaling connection for transmission of notifications delivered between an RLS/PS and a Watcher, a separate media connection will be set-up between the Watcher and a new logical entity, referred to as a Watcher Proxy. Alternatively, the new entity may be referred to as a Notification Proxy.

The media connection may be used for transmissions associated with any type of SIP event packages, thereby separating this type of transmissions from the ordinary SIP control channel signaling, i.e. the Watcher Proxy is not restricted to handling transmission associated only with the presence service.

One purpose with introducing a Watcher Proxy therefore is to gain better control over the SIP notification mechanism used over the SIP/IMS network, without having to change the remaining network infrastructure or the mechanisms presently used for the SIP traffic control signaling handling. The Watcher Proxy will provide a distinct separation between notification delivery and SIP traffic control signaling by enabling tunneling of one or more SIP subscriptions over one single session. In other words, all SIP subscriptions to all services available via the SIP/IMS network may be executed via the Watcher Proxy, using one single session, separating content delivery from the SIP control signaling.

Throughout this document, we define a Watcher or a Watcher Client, as a user, having a User Equipment (UE), provided with a User Agent (UA) adapted to handle SIP subscriptions, such as e.g. subscriptions for presence information of a specific Presentity. In the context described in this documents, the Watcher could also be referred to as a Subscriber, and, thus, the Watcher Client could be referred to as Subscribing Client. Content associated with a respective SIP subscription is provided from a Presentity or from an entity operating on behalf of the Presentity, to a Notifying node, such as e.g. an Application Server (AS) or a Presence Server (PS), as publications, i.e. as SIP publish messages.

Since the communication between the Presentity/content provider and the Notifying node is provided in a conventional manner, also when applying the suggested SIP event package delivery mechanism, this communication will not be discussed any further in this document. Delivery of notifications associated with a SIP event package therefore consequently will be described, starting at an AS and terminating at a subscribing Watcher Client.

The new Watcher Proxy will set-up a backend subscription, using conventional SIP subscribe procedures towards a Notifying node in order to be able to handle arriving notifications. As for the connection between the Watcher Proxy and the Watcher, however, the Watcher Proxy will use a media connection, typically a TCP connection, such as e.g. a Message Session Relay Protocol (MSRP) connection, which will be established using the SIP protocol. MSRP is a simple text-based protocol whose messages are either requests or responses that are run on the media plane. According to the suggested mechanism, the connection will be used for transmission of SIP notifications, embedded into a message, i.e. an MSRP message.

A method adapted to provide information delivery from a Notifying node of a SIP/IMS network to a Watcher Client according to one embodiment will now be described in further detail with reference to FIG. 2. The example illustrated in the figure comprises a Watcher Client 200, subscribing to a service, which is provided to the Watcher Client via a Notifying node 203.

Initially, Watcher Client 200 forwards a request, which in this embodiment is a SIP invite, in order to be able to establish a TCP connection, e.g. an MSRP connection, with a Watcher Proxy 202. The Watcher Proxy 202 will be the end point for the SIP invite, and will be acting as a Business-to-business User Agent (B2BUA) towards the Notifying node 203. It is to be understood, that in a typical scenario, the Watcher Proxy 202 may be acting as a B2BUA towards a plurality of Notifying nodes. As indicated with a first step 2:1, Watcher Client 200 therefore forwards the SIP invite to a Call Session Control Function 201 (CSCF) of a SIP/IMS network. Instead of forwarding the SIP invite directly to the Notifying node 203, as would have been standard procedures for a typical SIP session, the SIP invite is forwarded from the SIP/IMS network to the Watcher Proxy 202 in another step 2:2. The Watcher Proxy 202 may be implemented as a separate node or as a function integrated in another existing node, such as e.g. an RLS.

In a next step 2:3, the SIP session is used for establishing a TOP connection, such as e.g. an MSRP connection, which will be used for initiating a SIP subscription. The initiation of the SIP subscription will be achieved by forwarding a SIP subscribe message to Watcher Proxy 202 over the TCP connection, wherein the SIP subscribe message is embedded into another message, i.e. an MSRP message, if the TCP connection is an MSRP connection. The SIP subscribe message, is a request for a specific service, identified by a SIP event package, and provided via the Notifying node 203.

In response to the SIP subscribe message, Watcher Proxy 202 will now set-up a backend, or background subscription, towards the Server providing the requested service, i.e. Notifying Node 203. In the figure, this is indicated with a step 2:4, showing how the Watcher Proxy 202 forwards the SIP subscribe to the CSCF 201. Notifying node 203 is identified by CSCF, co-operating with other nodes of the SIP/IMS network, in a conventional manner, and the required backend subscription can be established by setting-up a connection also between CSCF 201 and the Notifying node 203 in a next step 2:5. Consequently, there is now a SIP based backend subscription established between the Notifying node 203 and the Watcher Proxy 202, and a TCP based connection established between the Watcher Proxy 202 and the Watcher 200.

Any notification, i.e. SIP notify, arriving to the Notifying node 203 from a Presentity, or any other source operating on behalf of the Presentity, will now be forwarded to the client which created the backend subscription, in this case Watcher Proxy 202, as indicated with a step 2:6.

When delivering a SIP notify to the Watcher Client 200, and possibly also to a plurality of additional Watcher Clients, Watcher Proxy 202, will use the channel, established in step 2:3. Step 2:3 resulted in an establishment of a persistent connection between Watcher Client 200 and Watcher Proxy 202, which will be used whenever a notification, which is associated with a SIP subscription for a specific service, identified by a SIP event package and set-up via the persistent connection, is received from the Notifying node 203. Every notification arriving to the Watching Proxy 202 will therefore be delivered to Watcher Client 200 over the TCP based channel, embedded into a message, e.g. an MSRP message, as indicated with the final step 2:7, i.e. notifications associated with different SIP subscriptions will be tunneled over one single session.

Figure 2:
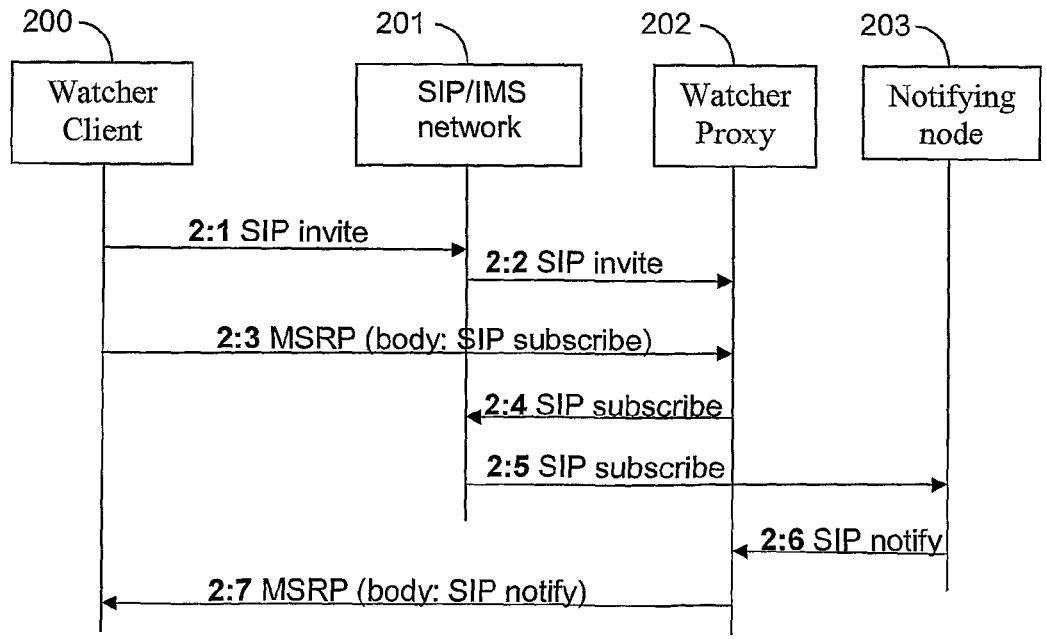
FIG. 2 is a signaling diagram, illustrating a method of delivering notifications, according to one embodiment.
Figure 3:
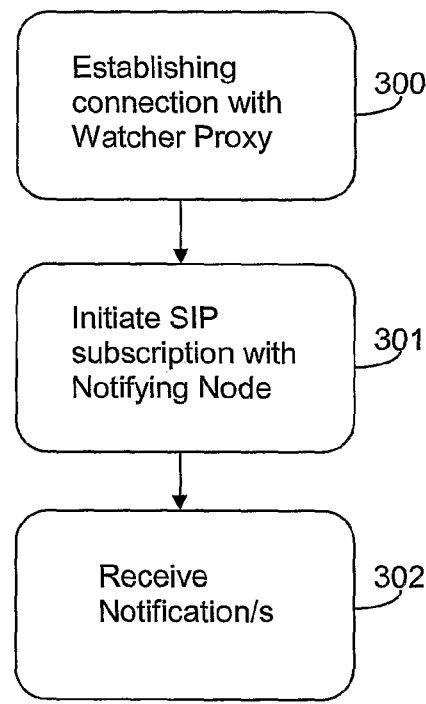
FIG. 3 is a flow chart illustrating the steps of a procedure executed by a Watcher Client for retrieving information from a Notifying node, according to one embodiment.

In FIG. 3, a flow chart is shown of a procedure for retrieving information from a Notifying node according to one embodiment. This procedure may basically correspond with the example shown in FIG. 2.

In a first step 300, a connection which will be able to separate the notification traffic from the SIP traffic control signaling is established between a Watcher Client and a Watcher Proxy. This is initiated with a SIP session, as indicated with steps 2:1 and 2:2 in FIG. 2.

In a next step 301, the established connection is used for initiating a SIP subscription with a Notifying node, as described above for step 2:3 in FIG. 2, wherein a SIP subscribe will be delivered over the established connected embedded into a message.

Once the Watcher Proxy has set-up a connection, i.e. a backend SIP subscription, with the Notifying node the Watcher Client may receive notifications delivered via the connection, where the notifications are embedded into a message, as indicated with a final step 302, as well as with step 2:7 of FIG. 2.

Figure 4:
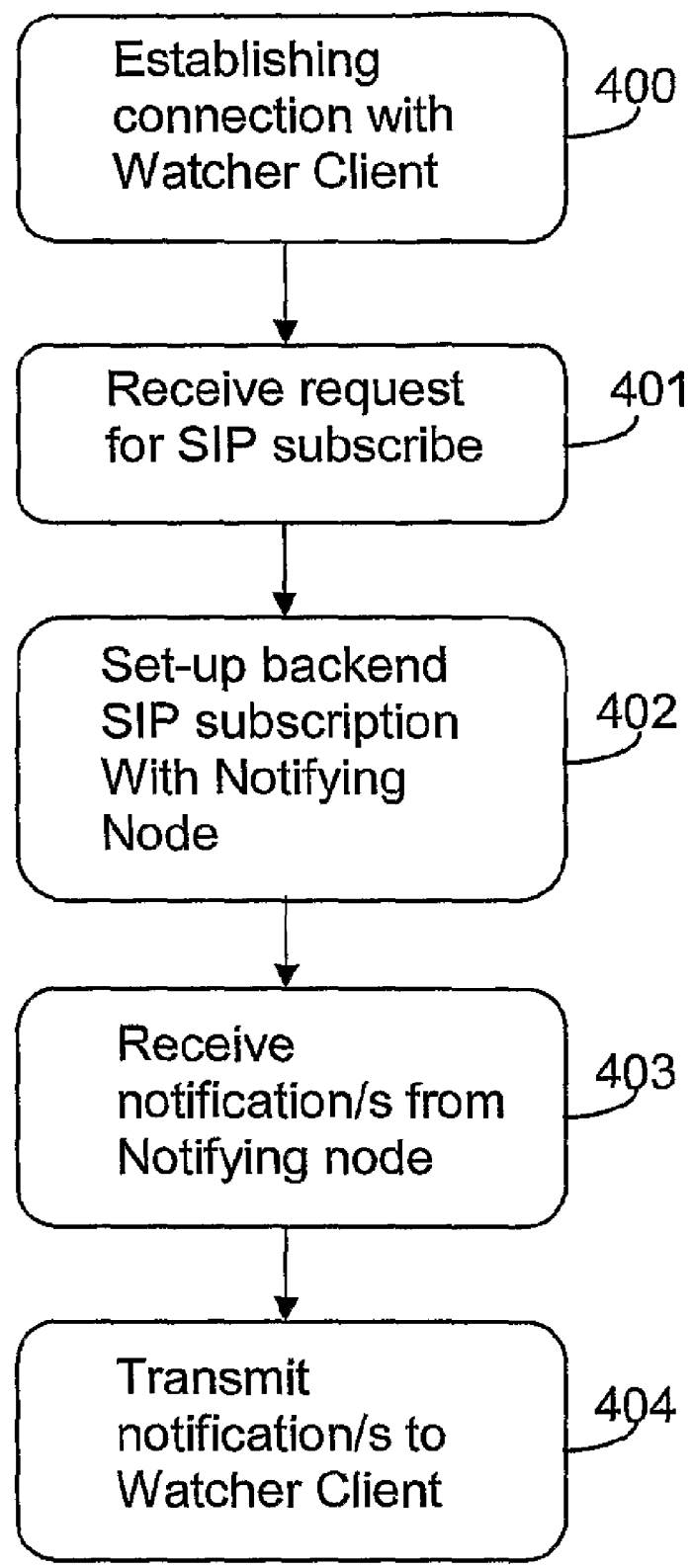
FIG. 4 is a flow chart illustrating the steps of a procedure executed by a Watcher Proxy for delivering information from a Notifying node to a Watcher Client, according to one embodiment.

FIG. 4 shows another flow chart, illustrating the corresponding procedure, executed at the Watcher Proxy, according to one embodiment.

In a first step 400 of FIG. 4, a connection is established with a Watcher Client, in response to a session request, typically a SIP-session request, received from the Watcher Client. Once the connection has been set-up, the Watcher Proxy may receive a request for a SIP subscription from the Watcher Client via the connection, wherein the SIP subscribe is embedded into a message. This is indicated with another step 401.

In response to the SIP subscribe, the Watcher proxy establishes a backend SIP subscription with the notifying node, as indicated with a step 402 and steps 2:4 and 2:5 in FIG. 2.

Notifications delivered from the Notifying node to the Watcher Client will now be transmitted, first to the Watcher Proxy 202 via a SIP notify, as indicated with another step 403 and step 2:6 in FIG. 2. At the Watcher Proxy, the notification, i.e. the SIP notify message, is then embedded into another message and transmitted via the connection which was established in step 400, and the embedded SIP notify is transmitted to the Watcher Client in a final step 404.

A Watcher Client which will be able to operate in accordance with the method described above will require functionality adapted therefore. A Watcher Client according to one embodiment will therefore be described with reference to FIG. 5. A Watcher Client may be implemented in any kind of stationary or mobile User Equipment, such as, e.g. a desktop computer, a Laptop, a mobile telephone or a PDA.

Figure 5:
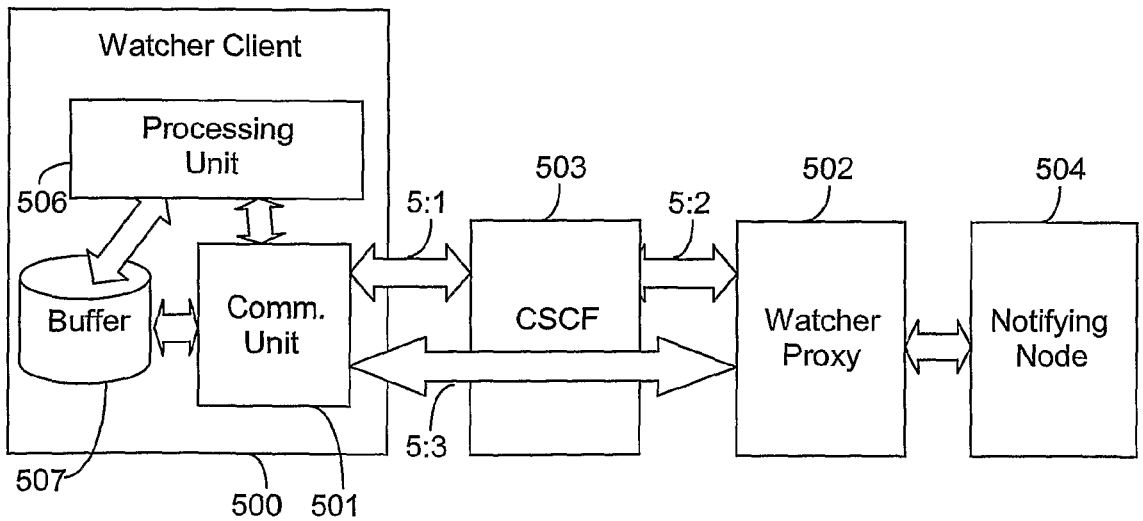
FIG. 5 illustrates a Watcher Client, communicating with a Watcher Proxy, according to one embodiment.

According to FIG. 5, a Watcher client 500, comprises a communication unit 501 for setting-up a SIP session 5:1, 5:2 with a Watcher Proxy 502, via a CSCF 503 of a SIP/IMS network, and for establishing another connection 5:3 with the Watcher Proxy 502 using the SIP session 5:1, 5:2.

The communication unit is also adapted to use connection 5:3 for initiating a backend SIP subscription between Watcher 502 Proxy and a Notifying node 504 by embedding a SIP subscribe message and by forwarding the message to Watcher Proxy 502 via said other connection. The communication unit 501 is also adapted to receive notifications, i.e. SIP notify messages, associated with the requested SIP subscription from the Watcher Proxy 502 and delivered as embedded SIP notify messages via connection 5:3.

In order for a processing unit 505 of the Watcher client 500 to be able to handle SIP notify messages, arriving over its own IP ports, the communication unit 501 of the Watcher Client 500, typically also will be provided with a buffer 506, adapted for this purpose. Thereby, the Watcher Client 500 will be able to buffer SIP notify messages, until any real time media and SIP traffic has been handled accordingly. The buffer 506 is typically adapted to buffer SIP notify messages according to predetermined rules.

A Watcher Proxy adapted to execute the method described above, according to one embodiment, will now be described in further detail with reference to FIG. 6.

Figure 6:
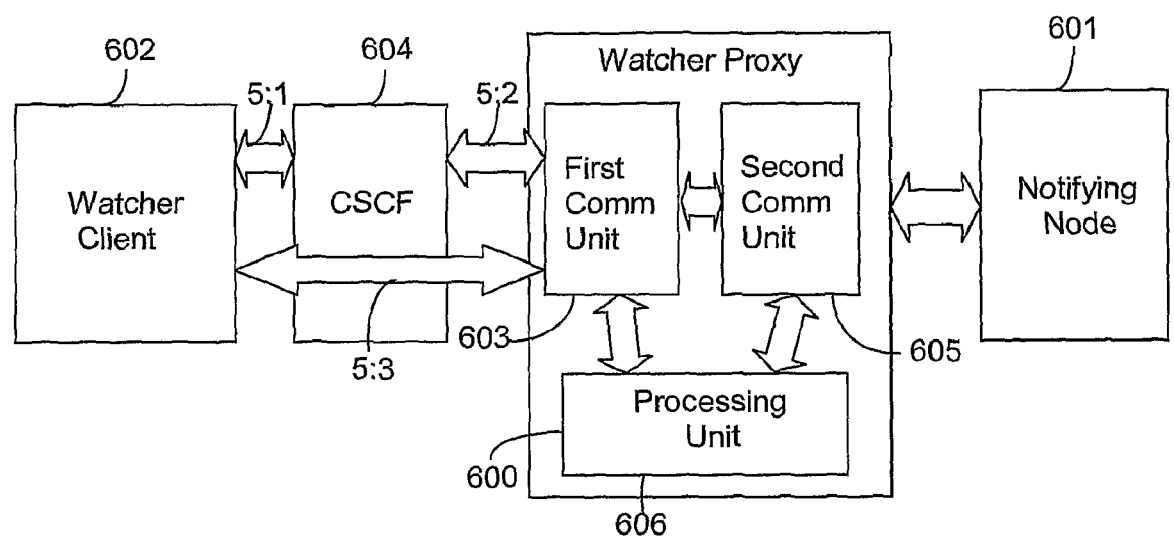
FIG. 6 illustrates a Watcher Proxy, communicating with a Notifying node and a Watcher Proxy, according to one embodiment.

The Watcher Proxy 600 of FIG. 6 is adapted to forward SIP notify messages, provided from a Notifying client 601, to a Watcher client 602, via a connection 5:3, which has been set-up via a SIP session 3:1,3:2. The Watcher Proxy 600 comprises a first communication unit 603 for setting-up the SIP session 5:1,5:2 with Watcher Client 602, via a CSCF 604 of a SIP/IMS network, and for establishing connection 5:3 with Watcher Client 602.

Watcher Proxy 600 also comprises a second communication unit 605, which is adapted to set-up a backend SIP subscription with the Notifying node 601, to be used when forwarding a SIP notify message which has been received from the Notifying node 601, to the Watcher Client 602 via the first communication unit 603 and connection 3:3, as an embedded SIP notify message. The SIP notify message is embedded by a processing unit 406 of the Watcher Proxy 400.

As mentioned above, the Watcher Proxy, as described in this document, is adapted to handle all types of SIP event packages. This means that a Watcher Client will be able to request for any type of service which is identified by a specific SIP event package. In addition, the content associated with the respective service will be delivered via a channel, e.g. an MSRP channel, other than the one used for the SIP traffic control signaling, and thus, SIP subscribe traffic and SIP control traffic will be transmitted via separate channels.

As specific priority policies may be defined for such a media channel, established between the Watcher Client and the Watcher Proxy, signaling transmitted on this channel will not interfere with the conventional SIP traffic control signaling. In addition, since traffic communicated over the described media channel will be running over its own IP ports, the Watcher Client may also be able to treat this traffic separately, e.g. by buffering incoming media traffic according to predetermined rules, which may then be handled accordingly first after any real time media and time critical SIP traffic has been handled.

By introducing and implementing the proposed Watcher Proxy, it will be possible to avoid that SIP subscribe traffic interfere with SIP control traffic, such as e.g. SIP invite messages. As the Watcher Proxy is using an existing protocol for the communication with the Watcher Client, existing mechanisms for policy handling may also be used, enabling a less complex implementation.

While the invention has been described with reference to specific exemplary embodiments, the description is in general only intended to illustrate the inventive concept and should not be taken as limiting the scope of the invention. Although the concepts of IMS, MSRP and XCAP have been used when, describing the above embodiments, any other similar suitable standards, protocols and network elements may basically be used as described herein. The present invention is generally defined by the following independent claims.

The invention claimed is:

1. A method of retrieving information delivered from a Notifying node of a SIP/IMS network to a Watcher Client, comprising the following steps, executed by the Watcher Client:
    setting-up a SIP session with a Watcher proxy
    establishing a connection with the Watcher Proxy, using said SIP session, said Watcher Proxy for handling SIP subscriptions, wherein each SIP subscription is a subscription for a specific service, said service being identified by a SIP event package,
    initiating a SIP subscription between said Watching Proxy and said Notifying node, by forwarding a SIP subscribe message to said Watcher Proxy via said connection, said SIP subscribe message being embedded in a Message Session Relay Protocol (MSRP) message, and
    receiving at least one notification associated with said SIP subscription from said Watcher Proxy, said notification being delivered via said connection as a SIP notify message embedded in a MSRP message, for enabling notifications to be transmitted via the SIP/IMS network separate from a SIP control channel of said network.

2. The method according to claim 1, further comprising the step of:
    buffering each of said at least one received notification prior to handling said each of said at least one received notification according to predetermined rules.

3. A method of delivering information from a Notifying node of a SIP/IMS network to a Watcher Client, comprising the following steps:
    establishing a connection with said Watcher Client, in response to a session request received from the Watcher Client,
    receiving a request for a SIP subscription from said Watcher Client, said SIP subscription, being delivered as a SIP subscribe message embedded in a Message Session Relay Protocol (MSRP) message, via said connection,
    setting-up a backend SIP subscription with said Notifying node, in response to receiving said request,
    receiving at least one notification associated with said SIP subscription from said Notifying node, and
    transmitting each received notification to said Watcher Client via said connection as a SIP notify message embedded in a MSRP message, for enabling notifications to be transmitted via the SIP/IMS network separate from a SIP control channel of said network, wherein said steps are executed by an intermediate Watcher Proxy, said Watcher Proxy for handling SIP subscriptions, each of which is a subscription for a specific service, each service being identified by a SIP event package.

4. The method according to claim 3, wherein said session request is a SIP invite.

5. The method according to claim 3, wherein said transmitting step is executed according to predetermined priority policies, specified for said connection.

6. The method according to claim 3, wherein said connection is a TCP connection which is established using the SIP protocol.

7. The method according to claim 3, wherein said connection is a Message Session Relay Protocol (MSRP) connection.

8. A client for retrieving information delivered from a Notifying node of a SIP/IMS network, said client comprising:
- a communication hardware unit for setting-up a SIP session with a Watcher Proxy, said Watcher Proxy for handling SIP subscriptions, wherein each SIP subscription is a subscription for a specific service, said service being identified by a SIP event package, and for establishing another connection with the Watcher Proxy using said SIP session, said communication hardware unit using said another connection for initiating a backend SIP subscription between said Watcher Proxy and said Notifying node by embedding a SIP subscribe message in a Message Session Relay Protocol (MSRP) message and by forwarding said MSRP message to the Watcher Proxy via said another connection, said communication hardware unit also for receiving at least one SIP notify associated with said SIP subscription from said Watcher Proxy and for delivering said SIP notify embedded in a Message Session Relay Protocol (MSRP) message via said another connection, enabling notifications to be transmitted via the SIP/IMS network separate from a SIP control channel of said network, and
- a processing unit for processing said SIP notifying message.

9. The client according to claim 8, wherein said client is a Watcher client.

10. The client according to claim 8, wherein said hardware unit further comprises:
- a buffer for buffering, prior to handling, each of said at least one received SIP notification messages, said buffering procedure being executed according to predetermined rules.

11. The client according to claim 8, wherein said client is implemented in a stationary or a mobile User equipment.

12. The client according to claim 11, wherein said User equipment is one of a: Desktop computer, a Laptop, a mobile telephone or a PDA.

13. A node for delivering information from a Notifying node of a SIP/IMS network to a Watcher Client, said node comprising:
- a first communication hardware unit for setting up a SIP session with the Watcher Client, and for establishing another connection with said Watcher Client using said SIP session, said first communication hardware unit also for receiving a request for a SIP subscription, said request being a SIP subscribe message which is delivered via said another connection embedded in a Message Session Relay Protocol (MSRP) message,
- a second communication hardware unit for setting up a backend SIP subscription with the Notifying node, in response to receiving said embedded SIP subscribe message and for receiving at least one SIP notify message associated with said SIP subscription from the Notifying node via said backend SIP subscription, said second communication hardware unit also for transmitting each received SIP notify message to said Watcher Client via said connection embedded in a Message Session Relay Protocol (MSRP) message for enabling notifications to be transmitted via the SIP/IMS network separate from a SIP control channel of said network, and
- a processing unit for embedding a received SIP notify message into said MSRP message, and for forwarding said embedded message to the Watcher Client via said first communication hardware unit and said another connection.

14. The node according to claim 13, wherein said node is a Watcher Proxy which is for handling SIP subscriptions, each of which is a subscription for a specific service, being identified by a SIP event package.

* * * * *

UNITED STATES PATENT AND TRADEMARK OFFICE
CERTIFICATE OF CORRECTION

| | | |
|---|---|---|
| PATENT NO. | : 8,386,616 B2 | Page 1 of 1 |
| APPLICATION NO. | : 12/742498 | |
| DATED | : February 26, 2013 | |
| INVENTOR(S) | : Lindgren et al. | |

It is certified that error appears in the above-identified patent and that said Letters Patent is hereby corrected as shown below:

In the Drawings:

In Fig. 6, Sheet 4 of 4, for Tag "603", in Line 2, delete "Comm" and insert -- Comm. --, therefor.

In Fig. 6, Sheet 4 of 4, for Tag "605", in Line 2, delete "Comm" and insert -- Comm. --, therefor.

In the Specification:

In Column 1, Line 35, delete "reach ability," and insert -- reachability, --, therefor.

In Column 5, Line 40, delete "TOP" and insert -- TCP --, therefor.

In the Claims:

In Column 8, Line 17, in Claim 1, delete "proxy" and insert -- proxy, --, therefor.

Signed and Sealed this
Sixteenth Day of July, 2013

Teresa Stanek Rea
*Acting Director of the United States Patent and Trademark Office*